US005155506A

United States Patent [19]

Yamaguchi

[11] Patent Number: 5,155,506

[45] Date of Patent: Oct. 13, 1992

[54] ELECTROPHOTOGRAPHIC APPARATUS MAINTAINING EXPOSURE DEVICE IN A FIXED RELATIONSHIP TO THE PHOTOSENSITIVE MEMBER WHEN PAPER JAMS ARE CLEARED

[75] Inventor: Yasuyoshi Yamaguchi, Shizuoka, Japan

[73] Assignee: Tokyo Electric Co., Ltd., Tokyo, Japan

[21] Appl. No.: 648,230

[22] Filed: Jan. 31, 1991

[30] Foreign Application Priority Data

Jan. 31, 1990 [JP] Japan .................................... 2-20904

[51] Int. Cl.[5] .............................................. G01D 15/06

[52] U.S. Cl. .................................. 346/160.1; 346/145; 346/107 R; 346/160

[58] Field of Search .................. 346/153.1, 160, 160.1, 346/107 R, 108, 145, 146; 355/200

[56] References Cited

U.S. PATENT DOCUMENTS

| | | | |
|---|---|---|---|
| 4,386,841 | 6/1983 | Wakao et al. | 355/200 |
| 4,535,341 | 8/1985 | Kun et al. | 346/107 R |
| 4,542,976 | 9/1985 | Kasamura | 355/200 |
| 4,605,299 | 8/1986 | Mochimaru | 355/200 |
| 4,673,956 | 6/1987 | Kobayashi | 346/160 |
| 4,774,531 | 9/1988 | Tokita | 346/145 |
| 4,785,319 | 11/1988 | Fujino et al. | 346/160 |
| 4,796,037 | 1/1989 | Takada et al. | 346/160.1 |
| 4,947,208 | 8/1990 | Komatsu et al. | 355/200 |
| 4,984,018 | 1/1991 | Andou et al. | 355/200 |
| 4,985,731 | 1/1991 | Sakakura et al. | 355/200 X |
| 5,041,872 | 8/1991 | Nukaya et al. | 355/200 |
| 5,089,846 | 2/1992 | Tabuchi | 355/200 |

FOREIGN PATENT DOCUMENTS

| | | |
|---|---|---|
| 0322219 | 12/1988 | European Pat. Off. . |
| 0345089 | 12/1989 | European Pat. Off. . |
| 60-205462 | 10/1985 | Japan . |
| 61-156070 | 7/1986 | Japan . |
| 63-95464 | 4/1988 | Japan . |
| 63-210857 | 9/1988 | Japan . |

*Primary Examiner*—Benjamin R. Fuller
*Assistant Examiner*—Randy W. Gibson
*Attorney, Agent, or Firm*—Oblon, Spivak, McClelland, Maier & Neustadt

[57] ABSTRACT

The inventive electrophotographic apparatus includes a photosensitive member unit fitted detachably to the main unit of apparatus. On the photosensitive member unit, a photosensitive member, exposure device, and a connector for connecting the exposure device to a drive circuit incorporated in the main unit are mounted, so that the relative position between the photosensitive member and exposure device does not need to be adjusted even after a jam treatment or the like.

6 Claims, 2 Drawing Sheets

ELECTROPHOTOGRAPHIC APPARATUS MAINTAINING EXPOSURE DEVICE IN A FIXED RELATIONSHIP TO THE PHOTOSENSITIVE MEMBER WHEN PAPER JAMS ARE CLEARED

FIELD OF THE INVENTION AND RELATED ART STATEMENT

The present invention relates to an electrophotographic apparatus which applies a light signal to a charged photosensitive member, develops a formed electrostatic latent image, and transfers the image to a print paper, and particularly to an electrophotographic apparatus which uses an exposure device of the self-scanning type as an exposure device for applying the light signal to the photosensitive member.

In the electrophotographic apparatus, the photosensitive member which has been charged on its external surface by the charging device is exposed to a light beam from the exposure device thereby to form an electrostatic latent image. A conventional exposing scheme is of the deflection scanning type in which a light beam emitted by a light source such as a laser diode is manipulated by a rotary mirror to scan the photosensitive member. More recently, an exposure scheme of the self-scanning type has been developed. An exposure scheme based on the exposure device of this self-scanning type is such that an active layer in the form of a thin film made of zinc sulfide or the like including active elements is placed between dielectric layers, and a line head formed of a linear arrangement of end-plane light emitting EL (electroluminescence) elements, with the active layer member being held between a pair of electrodes, is housed in a case to form an exposure device, so that the active layer has its end-plane emitting the light toward the photosensitive member in response to the application of a voltage to both electrodes.

The voltage describes the problems involved in the above-mentioned conventional technique. Usually, the photosensitive member and exposure device are supported separately in the main unit, and therefore in the treatment of paper jam or the like the photosensitive member and exposure device need to be separated apart and then brought to their positions again, the distance between the two members can be displaced slightly. In regard to the exposure device of the self-scanning type, it has a very small focal distance and a slight change in the distance to the photosensitive member results in the emergence of uneven light emission. On this account, the electrophotographic apparatus using a self-scanning exposure device necessitates the adjustment of the relative distance between the photosensitive member and exposure device at each event of jam treatment or the like, leaving a shortcoming of awkwardness.

OBJECT AND SUMMARY OF THE INVENTION

The first object of the present invention is to provide an electrophotographic apparatus which does not require the adjustment of the relative position between the photosensitive member and exposure device even after the jam treatment or the like.

The present second object of the present invention is provide an electrophotographic apparatus capable of facilitating the jam treatment or the like.

The third object of the present invention is to provide an electrophotographic apparatus capable of reducing the dimensions of the exposure device.

The fourth object of the present invention is to provide an electrophotographic apparatus having its exposure device virtually free from contamination.

The fifth object of the present invention is to provide an electrophotographic apparatus having its exposure device being rid of the influence of corona discharge by the charging device.

In order to achieve the above objectives, the present invention resides in an electrophotographic apparatus which operates to form an electrostatic latent image on a photosensitive member through the selective application of light signals produced by an exposure device to the photosensitive member which has been charged by a charging device, develop the electrostatic latent image with a development device, and transfer the image onto a sheet of paper with a transfer device thereby to print the image on the paper, wherein the apparatus is provided therein detachably with a photosensitive member unit, in which are fitted the photosensitive member, the exposure device and a connector which connects the exposure device to a drive circuit incorporated in the main unit. At a jam treatment or the like, the connector on the photosensitive member unit is operated to disconnect the exposure device from the drive circuit in the main unit and the photosensitive member unit is taken out of the main unit so that the paper transportation path is cleared. At this time, the photosensitive member and exposure device are fixed in the photosensitive member unit, and hence the relative position between the photosensitive member and exposure device can be retained invariably even if the photosensitive member unit is removed off the main unit for the jam treatment, and consequently the adjustment of the relative position between these members is not required.

The connector is disposed on the top of the photosensitive member unit so that it can easily be accessed for the jam treatment or the like.

The driver of the exposure device is disposed on the top of the photosensitive member unit and the light emitter of the exposure device is disposed on the side of the unit, with the light emitter being connected to the driver with a cable, so that the exposure device becomes compact.

At the position between the charging device and exposure device, a blocking member with its one side in close proximity to the photosensitive member is attached to the photosensitive member unit so as to prevent the contamination of the exposure device due to the deposition of stray toner.

In addition, at the position between the charging device and exposure device, an insulation member is attached to the photosensitive member unit so as to retard the influence of the corona discharge by the charging device on the exposure device.

Figure 1:
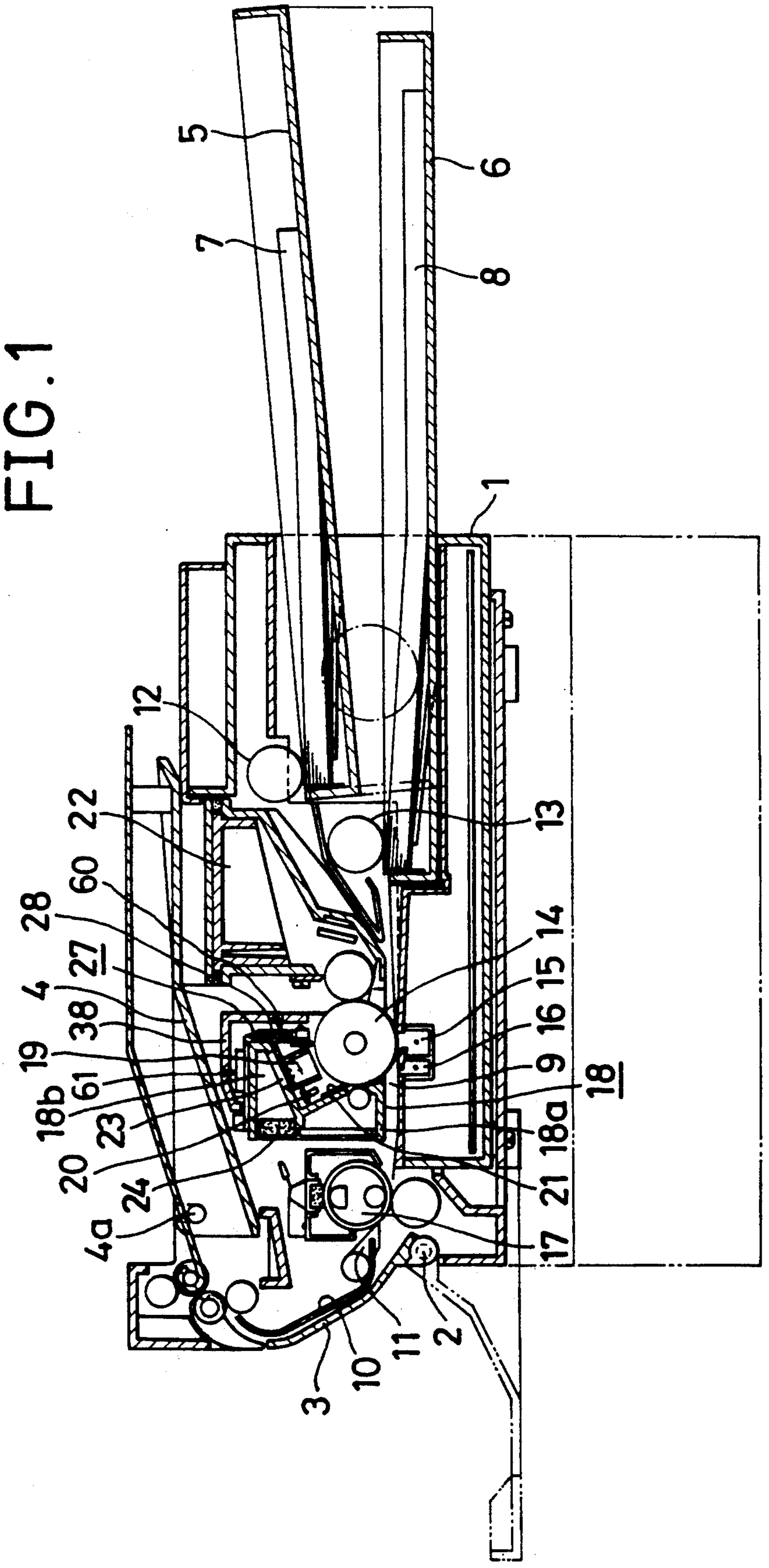
FIG. 1 is a vertical cross-sectional diagram showing the overall arrangement of an embodiment of this invention.

DESCRIPTION OF THE PREFERRED EMBODIMENT:

An embodiment of the present invention will be described with reference to the drawings. FIG. 1 is a vertical cross-sectional diagram showing the overall structure of the apparatus, in which indicated by 1 is the main unit of the electrophotographic apparatus. At the rear end of the main unit 1, a paper guide plate 3 is fitted rotatably on a pivot 2, and a paper tray 4 is mounted rotatably and detachably on a pivot 4*a* at the top of the main unit 1. The main unit 1 is provided with a paper transportation path 9 for feeding a sheet of paper 7 or 8 in a paper supply cassette 5 or 6, and in the rear of the paper transportation path 9, there is provided a guide plate 10 which confronts the paper guide plate 3 and guides the paper 7 or 8 toward the paper tray 4. Provided in the paper transportation path 9 are paper feed rollers 12 and 13 which are in contact with the uppermost ones of papers 7 and 8 in the paper supply cassettes 5 and 6, a transfer device 15 which applies charges to the paper 7 or 8 for transferring a developed image on the photosensitive member 14, a discharging device 16 which removes residual charges on the paper 7 or 8, a fixing device 17 which fixes the transferred image on the paper 7 or 8 that has passed through the transfer device 15, and a separator 11 which is in contact with the fixing roller in the fixing device 17 and function to separate the paper from the fixing roller, all disposed in order from the upperstream to downstream portions of the path.

The main unit 1 further incorporates a photosensitive member unit 18 and a development device 22, both fitted detachably. The photosensitive member unit 18 comprises the photosensitive member 14, a charging device 19 for applying charges to the photosensitive member 14 prior to the formation of a electrostatic latent image, a discharging device 20 which implements the light exposure for the photosensitive member 14 and unifies charges on the exterior surface of the photosensitive member 14, a cleaning device 21, an ozone filter 24, and an exposure device 27 of the self-scanning type, all fitted on the supporting member 18*a*. The supporting member 18*a* has a formation of a space 18*b* at the position between the charging device 19 and the ozone filter 24.

Figure 3:
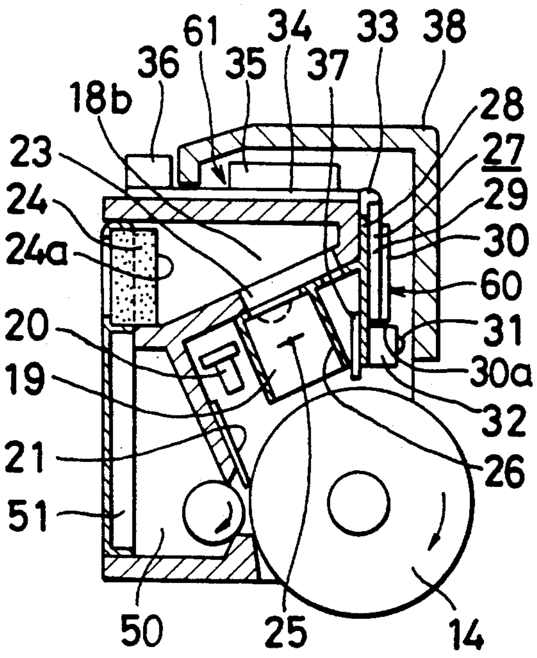
FIG. 3 is a vertical cross-sectional diagram of the unit.

As shown in FIG. 3, the charging device 19 has a frame 26 with a cross-sectional shape of channel for stretching a charging wire 25. The frame 26 is formed by drawing an aluminum bar, and it has a bracket section 28 on its one side surface for supporting the exposure device 27 of the self-scanning type. The exposure device 27 is made up of a light emitter 60 fixed to the bracket 28 and adriver 61 which is fixed to the top of the supporting member 18*a*, both members being connected to each other with a cable. The light emitter 60 comprises a light emitting board 29, an end-plane light-emitting board 30 having a linear arrangement of many end-plane light emitting EL elements, although they are not shown in the figure, fixed to the circuit board 29, and a focus lens 32 which is fixed to the bracket 28 by means of a hinge 31 to confront the edge 30*a* of the end-plane light emitting board 30. The driver 61 is a drive circuit board 34, which is connected to the light emitting circuit board 29 by the cable 33, with circuit component parts for driving the end-plane light emitting board 30 and a connector 36 being mounted on the circuit board 34. The connector 36 is to make electrical connection from the drive circuit (not shown) fixed in the main unit 1 to the the exposure device 27. Further fixed on the bracket 28 is an insulation board 37 which provides blocking and insulation between the charging device 19 and the exposure device 27 in the vicinity to the photosensitive member 14. Indicated by 38 is a cover which is supported by the supporting member 18*a* and is used to cover the exposure device 27. A toner room 50 is formed in the supporting member 18*a*, and the ozone filter 24 is held on a lid 51 which closes the toner room 50.

Figure 2:
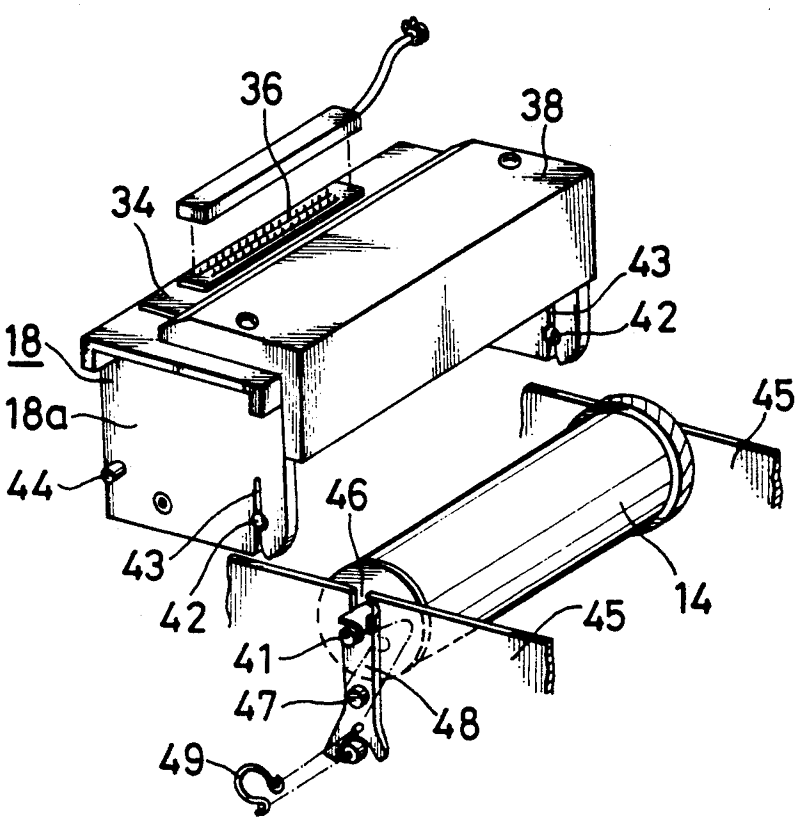
FIG. 2 is a expanded perspective diagram of the photosensitive member unit.

As shown in FIG. 2, the supporting member 18*a* has on its both sides formations of shaft holes 42 in which both ends of a shaft 41 for supporting the photosensitive member 14 rotatably are stopped, slits 43 running through the center of the shaft holes 42, and bosses 44 extending outwardly. Based on this structure, the photosensitive member 14 is fitted to the supporting member 18*a* by placing both ends of the shaft 41 in the shaft holes 42 while expanding the slits 43 resiliently. The photosensitive member unit 18 can be fitted to a frame 45 by inserting the shaft 41 of the photosensitive member 14 into a U-shaped groove 46 of the upper opening formed in the frame 45 which is provided inside the main unit 1 until the bosses 44 are in contact with the upper edge of the frame 45. A hook 48 for pushing the shaft 41 to the bottom of the groove 46 is attached rotatably on a pivot 47 on the frame 45. The hook 48 is applied with a force by a toggle spring 49 to both sides of its neutral position.

Based on the foregoing structure of the apparatus, the photosensitive member 14 is charged at a certain interval during the rotation by the charging device 19, the charged portion is scanned by the light beam from the exposure device 27, resulting in the formation of an electrostatic latent image, and the image is developed by the development device 22. A sheet of paper 7 or 8 in the paper supply cassette 5 or 6 is drawn by the feed roller 12 or 13 to the position between the photosensitive member 14 and transfer device 15, where the developed image on the photosensitive member 14 is transferred to the paper 7 or 8 by the transfer device 15, and after the image is fixed by the fixing device 17, the paper 7 or 8 is delivered to the paper tray 4. As shown by the dash-dot line in FIG. 1, when the paper guide plate 3 is swung downward, it functions as the paper tray.

At a jam treatment or maintenance service, the paper tray 4 is turned upward around the pivot 4*a*, the connector 36 is disconnected, the hook 48 is turned so that it retracts from the shaft 41 of the photosensitive member 14, and thereafter the photosensitive member unit 18 is removed to the upward direction, and the paper transportation path 9 is cleared. In this case, the photosensitive member 14 and exposure device 27 are held by the common supporting member 18*a*, and hence when the photosensitive member unit 18 is attached to or detached from the main unit 1 for the jam treatment, the relative position between the photosensitive member 14 and exposure device 27 can be retained constant invariably. Since the connector 36 is disposed on the top of the photosensitive member unit 18, it can be connected and disconnected easily, whereby a jam treatment and maintenance activity can be carried out smoothly. In addition, owing to the disposition of the light emitter 60 on the side of the photosensitive member unit 18 and the driver 61 on its top, the exposure device 27 can be made compact.

The photosensitive member 14 is cleaned by the cleaning device 21, but it may not be cleared of toner completely some times. Although toner is attracted by charges on the photosensitive member 14, a small part of toner may stray from it at portions discharged through the exposure to the light from the exposure device 27. The stray toner will move by being airborne in the turning air stream created by the rotation of the photosensitive member 14, but it does not reach the focus lens 32 by being blocked by the insulation board 37. The insulation board 37 also retards the influence of corona discharge by the charging device 19 on the exposure device 27.

The turning air stream created by the rotation of the photosensitive member 14 is led together with hot air to the insulation board 37 and they are ventilated effectively through the opening 23. The ozone filter 24 is located in this evacuation path, and hence ozone created by the discharging of the charging device 19 can be dissolved effectively by the ozone filter 24. Moreover, the space 18b in front of the ozone filter 24 provides a good route of air stream, and it is also possible to accumulate the ozone stream in this space and conduct it through the ozone filter slowly. Consequently, the ozone stream near the ozone-sourcing charging device 19 can be dissolved promptly. As a result, even in the provision of a fan for drawing the air stream containing ozone toward the ozone filter 24, the fan can be driven with a small motor, and the noise level of the apparatus can be lowered. In addition, by taking the unit member 18 out of the frame 45 of the main unit 1, the ozone filter 24 can easily be replaced.

In the foregoing embodiment, corona discharge by the charging device 19 takes place with a negative polarity, and hence toner charged to the negative polarity is attracted to the portions of the photosensitive member 14 which have been discharged through the exposure to the light from the exposure device 27. Corona discharge in the transfer device 15 takes place with a positive polarity. Corona discharge with a positive polarity creates little ozone, and therefore no ozone filter is required in the neighborhood of the transfer device 15.

What is claimed is:

1. An electrophotographic apparatus comprising: a main unit, a photosensitive member provided rotatably inside the main unit;

a charging device which is disposed to confront an exterior surface of said photosensitive member and adapted to charge said photosensitive member;

an exposure device including a linear arrangement of many light emitting elements which project a light signal based on image information on to the exterior surface of said photosensitive member that has been charged by said charging device thereby to form an electrostatic latent image;

a development device which is disposed to confront the exterior surface of said photosensitive member and adapted to develop the electrostatic latent image formed on said photosensitive member;

a transfer device which transfers the electrostatic latent image on said photosensitive member developed by said development device onto a sheet of paper;

a fixing device which is disposed on a downstream side of said photosensitive member and a transportation path of said paper; and a photosensitive member unit in which said photosensitive member, said exposure device, and a connector for connecting said exposure device to a drive circuit provided inside said main unit are fixed, said photosensitive member unit being fitted detachably in said main unit.

2. An electrophotographic apparatus according to claim 1, wherein said connector is disposed on a top surface of said photosensitive member unit.

3. An electrophotographic apparatus according to claim 2, further comprising:

a driver to which said connector is attached, disposed on the top surface of said photosensitive member unit; and a light emitter provided on a side face of said photosensitive member unit, said light emitter being disposed such that a head of said light emitter confronts said photosensitive member, with said light emitter and said driver being connected with a cable.

4. An electrophotographic apparatus according to claim 1, wherein a blocking member having one side thereof in close proximity to said photosensitive member is attached to said photosensitive member unit at a position between said charging device and said exposure device.

5. An electrophotographic apparatus according to claim 1, wherein an insulation member is attached to said photosensitive member unit at a position between said charging device and said exposure device.

6. An electrophotographic apparatus, comprising:

a main unit having a paper path;

a photosensitive member unit removable and replaceable in said main unit, said paper path being accessible when said photosensitive member unit is removed from said main unit to facilitate clearing of paper jams in said paper path;

a photosensitive member rotatably supported by said photosensitive member unit;

an exposure device mounted on said photosensitive member unit in a fixed relationship with said photosensitive member, said exposure device including an arrangement of end-plane light-emitting elements which project a light signal onto said photosensitive member to form an electrostatic latent image thereon;

a development device provided in said main unit, said development device confronting an exterior surface of said photosensitive member when said photosensitive member unit is received in said main unit, said development device being adapted to develop the electrostatic latent image formed on said photosensitive member;

a transfer device provided in said main unit downstream of said development device along said paper path, said transfer device transferring the electrostatic latent image on said photosensitive member developed by said development device onto a sheet of paper in the paper path; and a cable supplying electrical power from said main unit to said exposure device, wherein said photoconductive member unit has a connector permitting connection and disconnection of said cable from said photosensitive member unit to facilitate replacement and removal of said photosensitive member unit from said main unit.

* * * * *